United States Patent
Chevrette (10) Patent No.: US 8,112,862 B2
(45) Date of Patent: Feb. 14, 2012

(54) METHODS OF ASSEMBLING ROTORS HAVING NON-COMPLEMENTARY FLANGE OPENINGS

(75) Inventor: Richard Jon Chevrette, Troy, NY (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 12/641,806

(22) Filed: Dec. 18, 2009

(65) Prior Publication Data

US 2011/0146053 A1    Jun. 23, 2011

(51) Int. Cl.
*B21D 39/00* (2006.01)
*B23P 11/00* (2006.01)
*B23Q 17/00* (2006.01)

(52) U.S. Cl. ............... 29/407.09; 29/407.1; 29/525.01; 29/525.02; 29/525.11

(58) Field of Classification Search .............. 29/889.2, 29/407.09, 407.1, 525.01, 525.02, 525.11
See application file for complete search history.

(56) References Cited

U.S. PATENT DOCUMENTS 3,875,969 A * 4/1975 Sgourakes et al. ............ 138/103
6,125,526 A * 10/2000 Wierzchon ................. 29/525.02
6,148,494 A * 11/2000 Bauer et al. ................ 29/407.05

* cited by examiner

*Primary Examiner* — Jermie Cozart
(74) *Attorney, Agent, or Firm* — Hoffman Warnick LLC; Ernest G. Cusick (57) ABSTRACT

Methods for assembling a first rotor and a second rotor having non-complementary flange openings may include providing mating elements at substantially the center on corresponding rotor flanges, coupling dowels into each of a plurality of circumferentially spaced flange openings in one rotor flange, and mating the mating elements and extending the dowels through corresponding flange openings in the other rotor flange. The rotors are then progressively drawn closer by threading a threaded collar onto each dowel while ensuring alignment between the rotor flanges. Once the flanges contact, machining the flange openings makes them complementary. Once the dowels are removed, the rotors can be coupled by a fastener in each set of complementary flange openings.

20 Claims, 6 Drawing Sheets

METHODS OF ASSEMBLING ROTORS HAVING NON-COMPLEMENTARY FLANGE OPENINGS

BACKGROUND OF THE INVENTION

The invention relates generally to rotary machines. More particularly, the invention relates to methods of assembling two rotors having non-complementary flange openings.

In a typical rotary machine, a main rotor rotates and drives, or is driven by, a number of components. The main rotor is attached to another (control) rotor via mating end flanges using bolts extending through complementary flange openings typically arranged in a circle about the flanges. A situation may arise wherein the flange openings of one of the rotors are not the same dimensions as, or are not aligned with, the flange openings in the other rotor.

BRIEF DESCRIPTION OF THE INVENTION

A first aspect of the invention provides a method for assembling a first rotor and a second rotor having non-complementary flange openings, the method comprising: providing a male protrusion in substantially a center of a first rotor flange of the first rotor; providing a female opening corresponding to the male protrusion in substantially a center of a second rotor flange of the second rotor; coupling an at least partially threaded dowel into each of a plurality of circumferentially spaced flange openings in the first rotor flange; mating the male protrusion to the female opening and extending the plurality of at least partially threaded dowels through corresponding flange openings in the second rotor flange; progressively drawing the first rotor and the second rotor closer by threading a threaded collar onto each at least partially threaded dowel, while ensuring alignment between the first rotor flange and the second rotor flange by periodically measuring axial position of the flanges relative to a reference; with the first rotor flange and the second rotor flange contacting, machining at least one of: a flange opening in the first rotor flange and a flange opening in the second rotor flange to make complementary flange openings; removing the plurality of at least partially threaded dowels; and assembling the first rotor to the second rotor by coupling a fastener in each set of complementary flange openings.

A second aspect of the invention provides a method for assembling a main rotor and a control rotor having non-complementary flange openings, the method comprising: providing a male protrusion in substantially a center of a first one of a main rotor flange of the main rotor and a control rotor flange of the control rotor; providing a female opening corresponding to the male protrusion in substantially a center of a first other of the main rotor flange of the main rotor and the control rotor flange of the control rotor; coupling an at least partially threaded dowel into each of a plurality of circumferentially spaced flange openings in a second one of the main rotor flange and the control rotor flange; mating the male protrusion to the female opening and extending the plurality of at least partially threaded dowels through corresponding flange openings in a second other of the main rotor flange and the control rotor flange; progressively drawing the main rotor and the control rotor closer by threading a threaded collar onto each at least partially threaded dowel, while ensuring alignment between the main rotor flange and the control rotor flange by periodically measuring axial position of the flanges relative to a reference; with the main rotor flange and the control rotor flange contacting, machining at least one of: a flange opening in the first rotor flange and a flange opening in the second rotor flange to make complementary flange openings; removing the plurality of at least partially threaded dowels; and assembling the main rotor to the control rotor by coupling a fastener in each set of complementary flange openings.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention.

DETAILED DESCRIPTION OF THE INVENTION

Embodiments of the present invention provide a method for assembling rotors with non-complementary flange openings. At least one embodiment of the present invention is described below in reference to its application in connection with and operation of a turbo machine in the form of a steam turbine. However, it should be apparent to those skilled in the art and guided by the teachings herein that embodiments of the present invention are applicable to any suitable rotary machine such as a turbine and/or engine.

Figure 1:
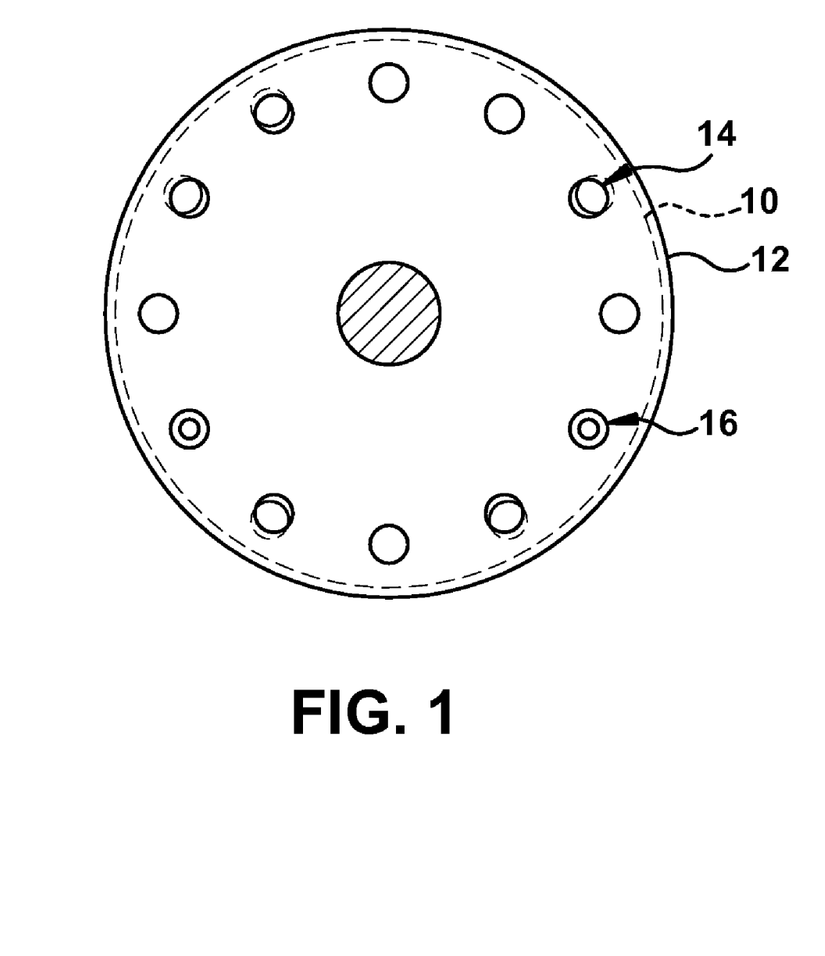
FIG. 1 shows a longitudinal cross-sectional view of rotor flanges having non-aligned flange openings.

FIG. 1 illustrates a longitudinal cross-sectional view of one rotor flange 10 and another rotor flange 12 that include flange openings that are not aligned, for example, either because they do not align as in set 14 or have different dimensions as in set 16. This situation may arise, for example, during servicing of a turbo machine such as a steam turbine. In this case, a rotor, or part thereof, made by one manufacturer may be replaced with a rotor, or part thereof, made by another manufacturer, and the flange openings may be non-complementary.

Figure 2:
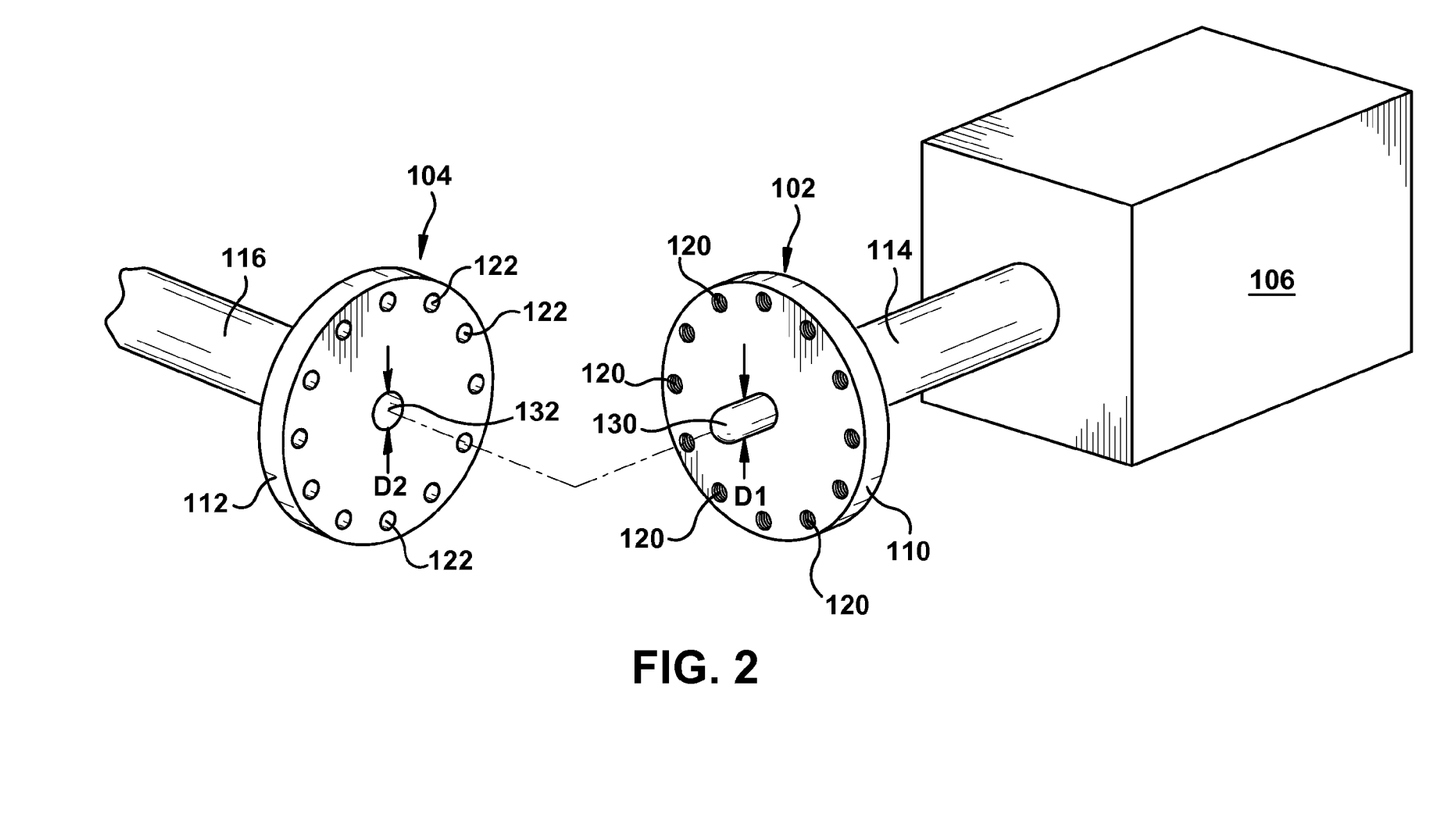
FIGS. 2-6 show perspective views of embodiments of a method of assembling rotors having non-complementary flange openings according to the invention.

Turning to FIGS. 2-5, a first rotor 102 and a second rotor 104 according to embodiments of this invention are shown. In one embodiment, first or second rotor 102, 104 (102 as illustrated) may be a main rotor of a rotary machine such as a turbo machine, and the other rotor may be a control rotor for connection to the main rotor. As shown in FIG. 2, first rotor 102 includes a first rotor flange 110 for coupling to a second rotor flange 112 of second rotor 104, so as to make the rotors act as unitary structure. Each flange 110, 112 is fixedly coupled to a respective shaft 114, 116, the latter of which may have different dimensions, e.g., diameter, length, etc. Each flange 110, 112 also includes a plurality of flange openings 120, 122, respectively. One flange, e.g., flange 110, may include flange openings 120 in the form of threaded recesses 124 (FIG. 4), and the other flange, e.g., flange 112, may include flange openings 122 in the form of threaded or non-threaded apertures 126, which may include counterbores 128 on an opposite face from flange 110. In this case, as will be described herein, a threaded fastener may pass through flange openings 122 and be threaded into flange openings 120 to couple rotors 102, 104.

As described relative to FIG. 1, one situation that may arise is that flange openings 120, 122 are non-complementary. The nature of flange openings 120, 122 not being complementary may take a variety of forms such as: not having identical dimensions (e.g., one opening is larger than the other or has different sized threads, etc.) and/or non-axial alignment. As noted elsewhere herein, this situation may arise, for example, where a rotor, or part thereof, made by one manufacturer is replaced with a rotor, or part thereof, made by another manufacturer. In order to address this situation, embodiments of the invention introduce embodiments of a method of assembling rotors 102, 104 with non-complementary flange openings 120, 122.

Turning to FIG. 2, although not necessary, a selected one of first rotor 102 and second rotor 104 may be assembled into a machine 106, e.g., generator, turbine, motor, etc., in which the selected one rotor will operate prior to some of the following methodology. Continuing with FIG. 2, a male protrusion 130 is provided in substantially a center of first rotor flange 110 of first rotor 102. In addition, a female opening 132 corresponding to male protrusion 130 is provided in substantially a center of second rotor flange 112 of second rotor 104. The center of each flange may be determined in any now known or later developed fashion, e.g., by crossing diameters of flanges 110, 112, measurement, etc. Male protrusion 130 may be provided in a variety of ways such as by welding or creating a threaded opening (not shown) and threadably coupling male protrusion 130 to flange 110. Female opening 132 may be provided using, for example, any boring process. While male protrusion 130 and female opening 132 are shown having corresponding substantially circular shapes, the corresponding shapes are not limited to circular and can be any shape that allows mating of male protrusion 130 and female opening 132. In one embodiment, male protrusion 130 has a diameter D1 larger than a diameter D2 of female opening 132, e.g., approximately 0.003 to 0.008 centimeters (0.001 to 0.003 inches) so as to create an interference fit therebetween when coupled.

Figure 3:
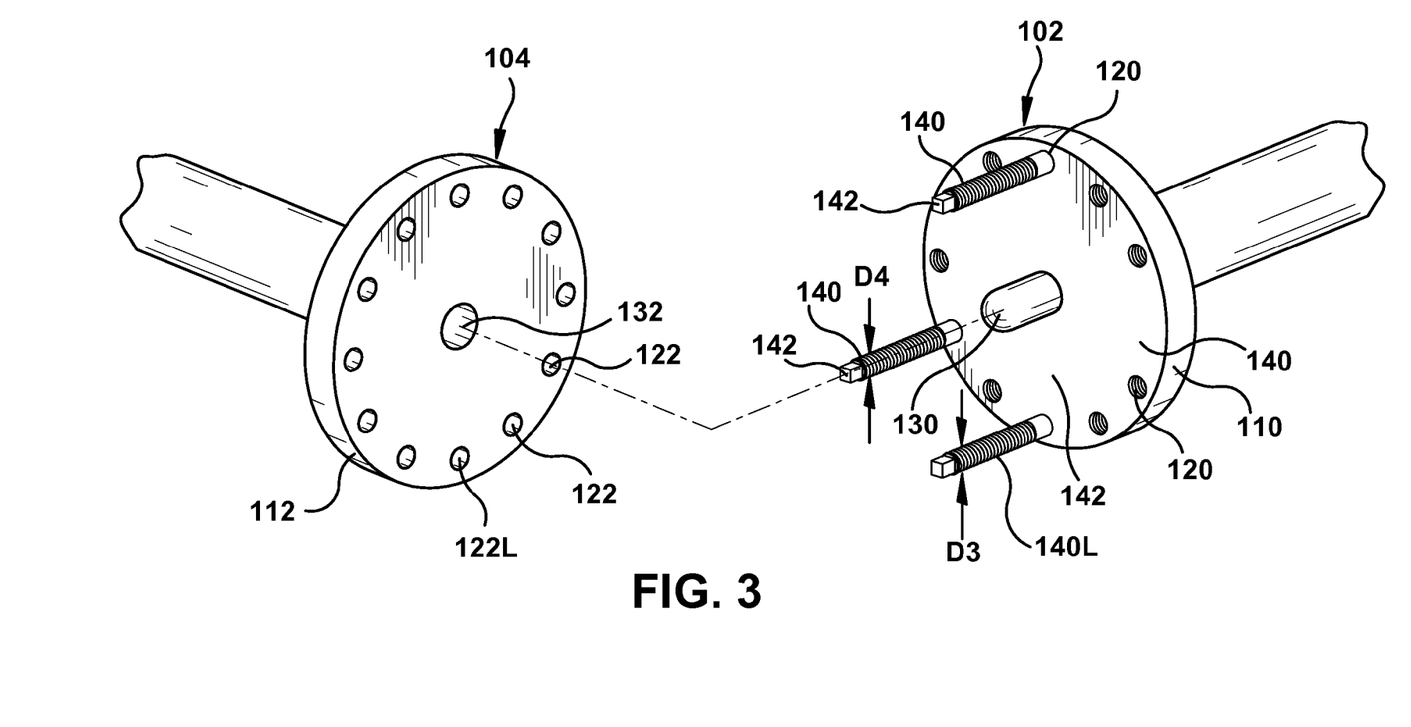
Figure 4:
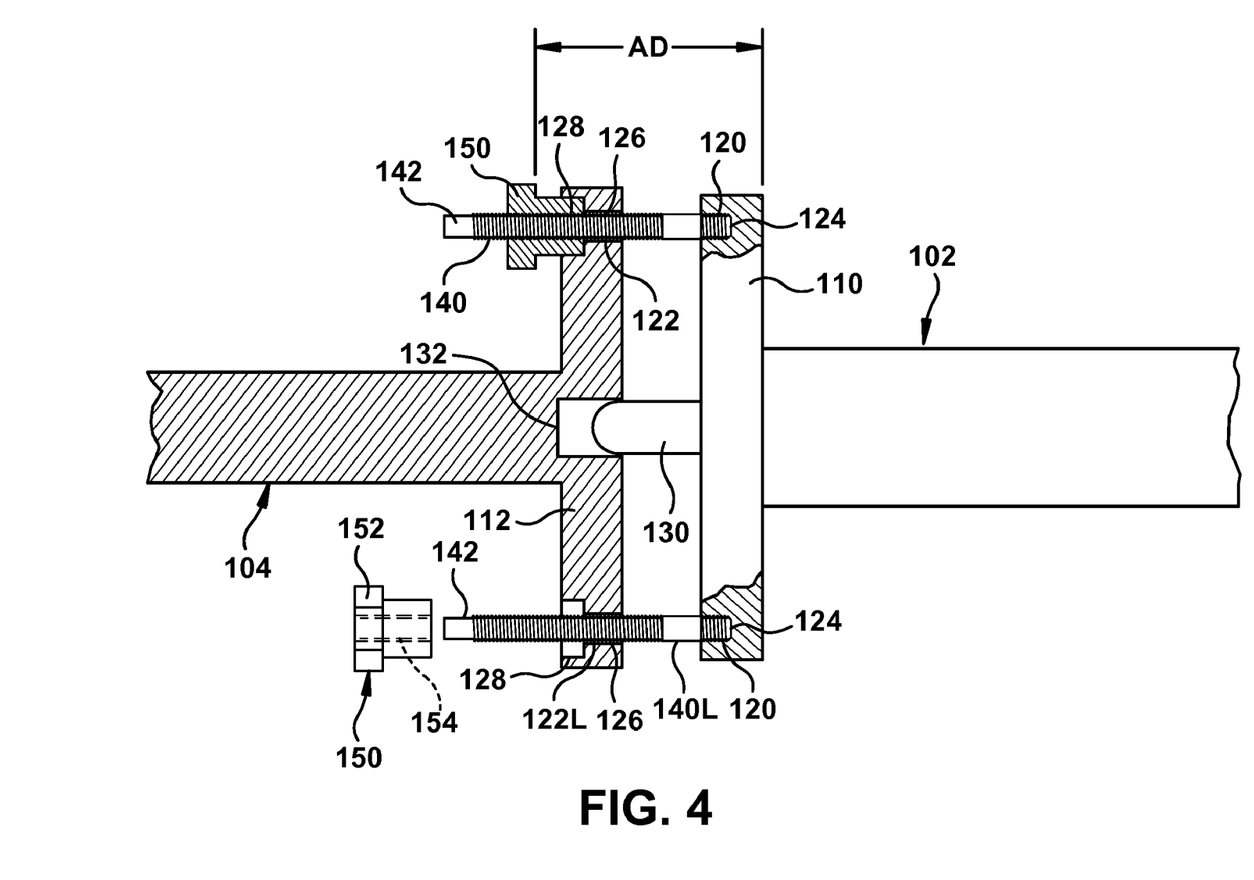

Referring to FIG. 3, an at least partially threaded dowel 140 is coupled into each of a plurality of circumferentially spaced flange openings 120 in first rotor flange 110. Those flange openings 120 that are selected to have a dowel 140 have a corresponding flange opening 122 in second rotor flange 112 that is sufficiently complementary to allow mating of dowel 140 therewith. Consequently, the number of dowels 140 used may vary from the four illustrated. Each dowel 140 may include a tool-receiving polygonal end portion 142 to assist in threading thereof into flange openings 120. However, end portion 142 may not be necessary in all cases. In addition, as shown in FIG. 4, one dowel 140L may have a closer tolerance relative to a respective flange opening 122 of second rotor flange 112 than a tolerance of the other dowels 140 relative to respective flange openings 122 of second rotor flange 112 thereof. For example, dowel 140L may have a larger diameter D3 than other dowels 140, i.e., diameter D4, or opening 122L in flange 112 may have a smaller inner diameter. The amount of difference in tolerance may be for example, approximately 0.005 centimeters (0.002 inches). As will become apparent herein, this tighter tolerance assists in proper positioning of flanges 110, 112 during coupling thereof in a circumferential direction.

FIG. 4 illustrates mating of male protrusion 130 to female opening 132 and extending of dowels 140 through corresponding flange openings 122 in second rotor flange 112. The interference fit between male protrusion 130 and female opening 132 ensures axial alignment of rotors 102, 104. First rotor 102 and second rotor 104 are then progressively drawn closer by threading a threaded collar 150 onto each dowel 140. That is, by application of force through each collar 150 to counterbore 128 in flange openings 122, rotors 102, 104 are drawn together. Each collar 150 may include a tool-receiving polygonal end portion 152 and a threaded opening 154 complementary to a respective dowel's threading. While dowels 140 and collar 150 have been described as having a threaded interaction, it is understood that other mechanisms may be applied to allow for the progressive drawing of flanges 110, 112 together, e.g., a hydraulic pulling ram may engage non-threaded dowels 140.

While the progressive drawing of rotors 102, 104 together occurs, alignment between first rotor flange 110 and second rotor flange 112 is ensured by periodically measuring axial position of the flanges relative to a reference. The reference used can take a variety of forms. For example, in one embodiment, ensuring alignment includes using first rotor flange 110 as the reference and periodically measuring axial displacement (AD) of each collar 150 relative to first rotor flange 110. The measurement can be made using any now known or later developed technique, e.g., calipers, lasers, etc. In this way, male protrusion 130 and female opening 132 engagement ensures that first and second rotor 102, 104 are held aligned axially, while dowels 140 ensure that second rotor 104 is circumferentially aligned with first rotor 102. Such axial measurements can be made throughout the process of threading on collars 150, to ensure proper alignment, as second rotor 104 is brought closer to first rotor 102.

Figure 5:
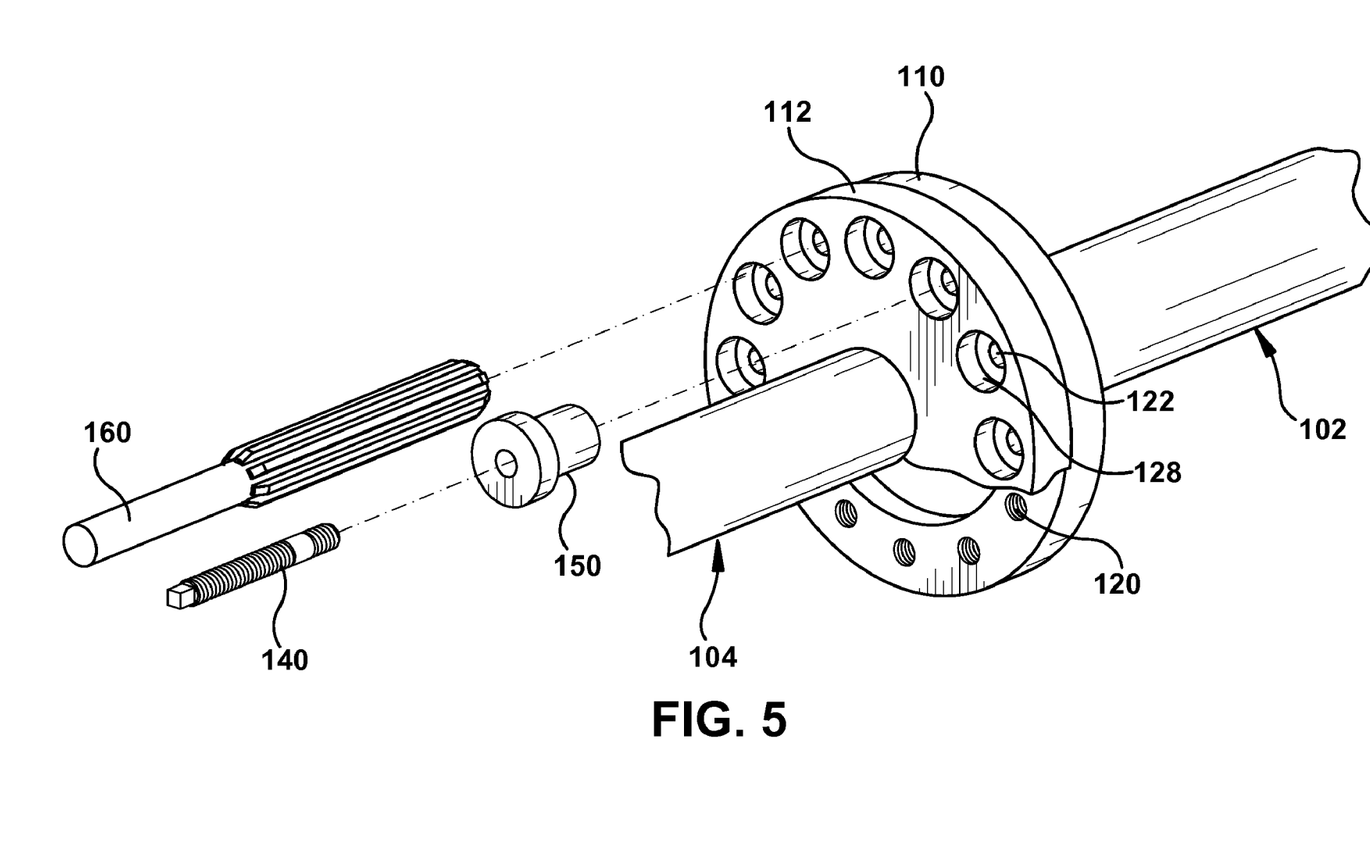

As shown in FIG. 5, with first rotor flange 110 and second rotor flange 112 contacting, at least one of: a flange opening 120 in first rotor flange 110 and a flange opening 122 in second rotor flange 112 is machined to make complementary flange openings 120, 122, i.e., a set of complementary openings. Machining can be carried out by any appropriate tool(s) 160, e.g., a bore head, a reamer head such as a shell reamer, a threading head, etc. The machining can act to axially align openings in flanges 110, 112, re-dimension openings, re-size threads, and modify any other structure capable of revision in the illustrated arrangement. As also shown in FIG. 5, once machining is complete, dowels 140 (and collars 150) are removed, i.e., by threadably removing them.

Figure 6:
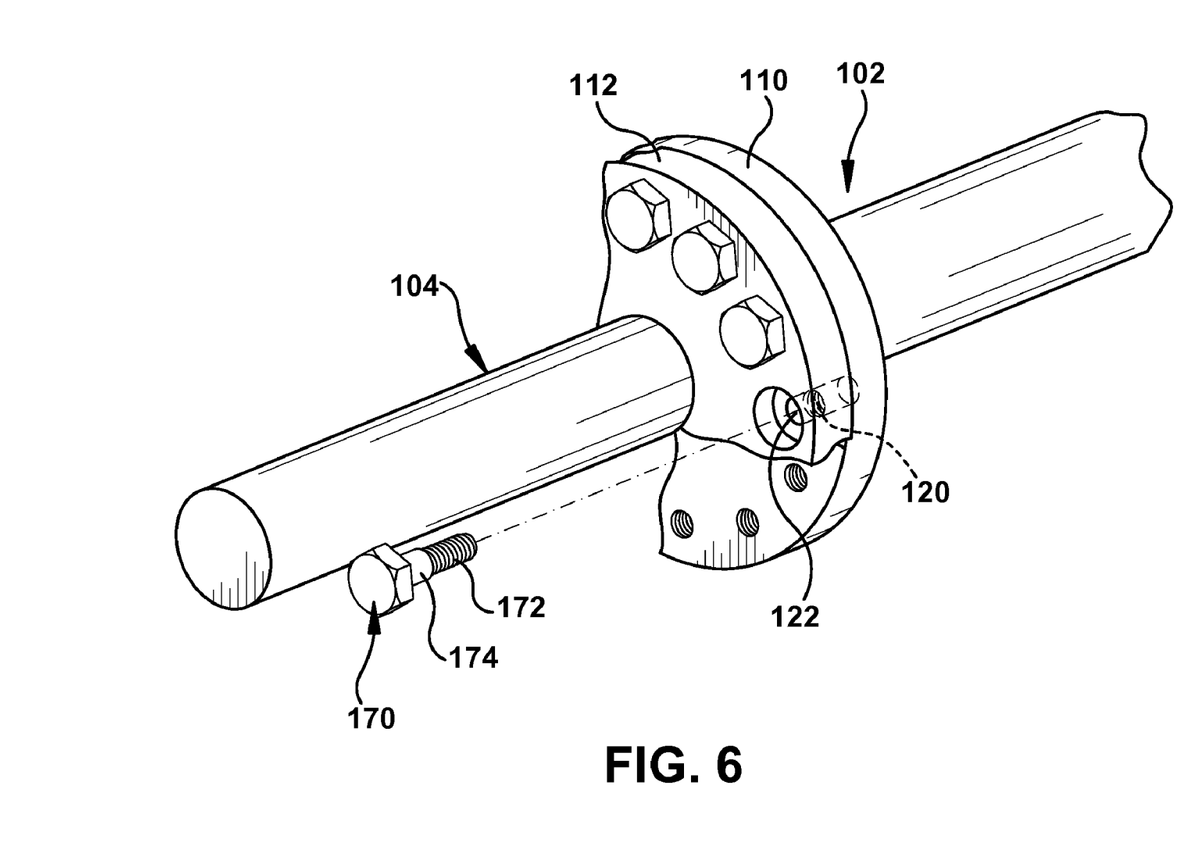

FIG. 6 shows assembling first rotor 102 to second rotor 104 by coupling a fastener 170 in each set of complementary flange openings 120, 122. In one embodiment, fastener 170 includes a threaded portion 172 and a doweled portion 174. Threaded portion 172 is sized to mate with threaded recesses 124 (FIG. 4) of rotor flange 110, as they may or may not have been modified. Doweled portion 174 protects against a sheering force as a load is applied to the coupling. If the original fasteners are used, then each doweled portion 174 may be machined to fit the re-dimensioned openings 120, 122. Fasteners 170 then can be inserted and tightened slowly, one section of the opening circle at a time.

The foregoing drawings show some of the processing associated according to several embodiments of this disclosure. In this regard, each drawing represents a process associated with embodiments of the method described. It should also be noted that in some alternative implementations, the acts noted in the drawings may occur out of the order noted in the figure and description or, for example, may in fact be executed substantially concurrently or in the reverse order, depending upon the act involved. In addition, while certain structure, e.g., male protrusion 130, threaded recesses 124 (FIG. 4), etc., have been illustrated on one or another rotor 102, 104, it is understood that positioning may be switched without departing from the scope of the invention. Further, one of ordinary skill in the art will recognize that additional diagrams that describe the processing may have been omitted for brevity.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for assembling a first rotor and a second rotor having non-complementary flange openings, the method comprising:
   providing a male protrusion in substantially a center of a first rotor flange of the first rotor;
   providing a female opening corresponding to the male protrusion in substantially a center of a second rotor flange of the second rotor;
   coupling an at least partially threaded dowel into each of a plurality of circumferentially spaced flange openings in the first rotor flange;
   mating the male protrusion to the female opening and extending the plurality of at least partially threaded dowels through corresponding flange openings in the second rotor flange;
   progressively drawing the first rotor and the second rotor closer by threading a threaded collar onto each at least partially threaded dowel, while ensuring alignment between the first rotor flange and the second rotor flange by periodically measuring axial position of the flanges relative to a reference;
   with the first rotor flange and the second rotor flange contacting, machining at least one of: a flange opening in the first rotor flange and a flange opening in the second rotor flange to make complementary flange openings;
   removing the plurality of at least partially threaded dowels; and
   assembling the first rotor to the second rotor by coupling a fastener in each set of complementary flange openings.

2. The method of claim 1, wherein a diameter of the male protrusion is larger than a diameter of the female opening.

3. The method of claim 1, wherein one of the at least partially threaded dowels has a closer tolerance relative to a respective flange opening of the second rotor flange than a tolerance of the other at least partially threaded dowels relative to respective flange openings of the second rotor flange thereof.

4. The method of claim 1, wherein each fastener includes a threaded portion and a doweled portion.

5. The method of claim 1, wherein each at least partially threaded dowel includes a tool-receiving polygonal end portion.

6. The method of claim 1, wherein each collar includes a tool-receiving polygonal end portion.

7. The method of claim 1, further comprising assembling a selected one of the first rotor and the second rotor into a machine in which the selected one will operate prior to the dowel coupling.

8. The method of claim 1, wherein the first rotor includes a main rotor of a turbo machine and the second rotor includes a control rotor.

9. The method of claim 1, wherein the second rotor includes a main rotor of a turbo machine and the first rotor includes a control rotor.

10. The method of claim 1, wherein the ensuring alignment includes using the first rotor flange as the reference and periodically measuring axial displacement of each collar relative to the first rotor flange.

11. The method of claim 1, wherein the non-complementary flange openings are at least one of: non-aligned and differently dimensioned.

12. A method for assembling a main rotor and a control rotor having non-complementary flange openings, the method comprising:
   providing a male protrusion in substantially a center of a first one of a main rotor flange of the main rotor and a control rotor flange of the control rotor;
   providing a female opening corresponding to the male protrusion in substantially a center of a first other of the main rotor flange of the main rotor and the control rotor flange of the control rotor;
   coupling an at least partially threaded dowel into each of a plurality of circumferentially spaced flange openings in a second one of the main rotor flange and the control rotor flange;
   mating the male protrusion to the female opening and extending the plurality of at least partially threaded dowels through corresponding flange openings in a second other of the main rotor flange and the control rotor flange;
   progressively drawing the main rotor and the control rotor closer by threading a threaded collar onto each at least partially threaded dowel, while ensuring alignment between the main rotor flange and the control rotor flange by periodically measuring axial position of the flanges relative to a reference;
   with the main rotor flange and the control rotor flange contacting, machining at least one of: a flange opening in the first rotor flange and a flange opening in the second rotor flange to make complementary flange openings;
   removing the plurality of at least partially threaded dowels; and
   assembling the main rotor to the control rotor by coupling a fastener in each set of complementary flange openings.

13. The method of claim 12, wherein a diameter of the male protrusion is larger than a diameter of the female opening.

14. The method of claim 12, wherein one of the at least partially threaded dowels has a closer tolerance relative to a respective flange opening through which it extends than a tolerance of the other at least partially threaded dowels relative to respective flange openings thereof.

15. The method of claim 12, wherein each fastener includes a threaded portion and a doweled portion.

16. The method of claim 12, wherein each at least partially threaded dowel includes a tool-receiving polygonal end portion.

17. The method of claim 12, wherein each collar includes a tool-receiving polygonal end portion.

18. The method of claim 12, further comprising assembling the main rotor into a machine in which the main rotor will operate prior to the dowel coupling.

19. The method of claim 12, wherein the ensuring alignment includes using the main rotor flange as the reference and periodically measuring axial displacement of each collar relative to the main rotor flange.

20. The method of claim 12, wherein the non-complementary flange openings are at least one of: non-aligned and differently dimensioned.

* * * * *